United States Patent
Meyer

(10) Patent No.: US 12,410,973 B2
(45) Date of Patent: Sep. 9, 2025

(54) NATURAL GAS CONDITIONING AND NGL RECOVERY

(71) Applicant: James M. Meyer, Golden, CO (US)

(72) Inventor: James M. Meyer, Golden, CO (US)

(*) Notice: Subject to any disclaimer, the term of this patent is extended or adjusted under 35 U.S.C. 154(b) by 160 days.

(21) Appl. No.: 18/144,388

(22) Filed: May 8, 2023

(65) Prior Publication Data
US 2024/0377126 A1    Nov. 14, 2024

(51) Int. Cl.
*F25J 3/02* (2006.01)
*B01D 53/00* (2006.01)
*C10L 3/10* (2006.01)

(52) U.S. Cl.
CPC .......... *F25J 3/0228* (2013.01); *B01D 53/002* (2013.01); *F25J 2220/64* (2013.01)

(58) Field of Classification Search
CPC .... B01D 53/002; F25J 3/0228; F25J 2220/64; C10L 3/101; C10L 3/106; C10L 3/10; C10L 3/0233; C10L 3/0238; C10L 3/0242; C10L 2290/06; C10L 2290/46; C10L 2290/48
USPC .................. 62/611, 618, 619; 585/800, 802
See application file for complete search history.

(56) References Cited

U.S. PATENT DOCUMENTS

| | | | |
|---|---|---|---|
| 2011/0132033 A1* | 6/2011 | Prim | F25J 3/0242 62/618 |
| 2019/0071378 A1* | 3/2019 | Visser | C10G 5/06 |
| 2022/0228079 A1* | 7/2022 | Meyer | F25J 1/0022 |
| 2022/0228803 A1* | 7/2022 | Meyer | B01D 53/002 |
| 2023/0012234 A1* | 1/2023 | B Zainal Abidin | B01D 5/0093 |

FOREIGN PATENT DOCUMENTS

WO    WO-2009023252 A1 *    2/2009    ............ F25J 3/0233

OTHER PUBLICATIONS

NGL Pro Flare Reduction, NGL Recovery and Gas Conditioning, Aspen Engineering Services, LLC (Mar. 21, 2018 (Year: 2018).*

* cited by examiner

Primary Examiner — Frank M Lawrence, Jr.

(57) ABSTRACT

Rich natural gas is first compressed, and then cooled by a series of heat exchangers and an ambient air cooler. The cooled mixture of natural gas, natural gas liquid (NGL), and water is first separated in a high-pressure three-phase separator. NGL flows through a depressurization valve and NGL is separated from gas in a second separator for storage and transport such as in a conventional propane tank. A resulting lean natural gas is suitably conditioned for internal combustion, compressed natural gas processing, or liquid fuel processing.

14 Claims, 1 Drawing Sheet

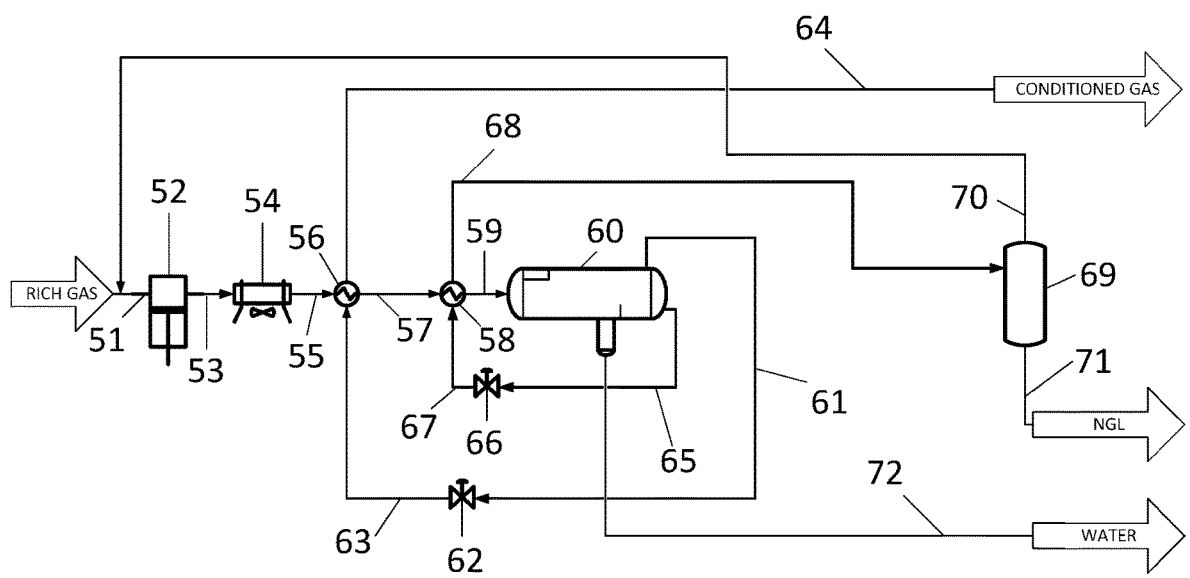

NATURAL GAS CONDITIONING AND NGL RECOVERY

FIELD OF THE INVENTION

The invention relates generally to conditioning of rich natural gas and natural gas liquid (NGL) recovery.

BACKGROUND

Rich natural gas is produced along with crude oil when oil is produced by horizontal drilling and fracking. The produced natural gas is called associated gas and is comprised primarily of methane but also has heavier hydrocarbons including ethane, propane, butane, heptanes and hexane. The heavier hydrocarbons are often collectively called NGL. Unused gas-phase components are often wasted by the practice of flaring.

The rich natural gas causes two problems for the oil industry. First, the heavier hydrocarbons cause the gas energy content to be too high for internal combustion in engines. Specifically, the high energy content causes internal combustion engines to knock. Second, the high energy content makes the rich natural gas unsuitable for use as a compressed natural gas (CNG) fuel. The NGC process removes the valuable NGL hydrocarbons for sale and distribution while concurrently producing a lean natural gas suitable for internal combustion and CNG. Consequently, the associated gas may be put to good use instead of wasted up a flare stack.

Competing processes include mechanical refrigeration and Joule Thompson refrigeration. Mechanical refrigeration is relatively expensive and has reliability issues, particularly in cold weather. Mechanical refrigeration is also bulky and difficult to move from site to site as is often needed in oil fields. Conventional Joule Thompson refrigeration has the disadvantage of emulsifying the three-phase mixture from the depressurization valve. Consequently, NGL is often emulsified with the water.

SUMMARY

A natural gas conditioning process (NGC) described herein conditions rich natural gas for use as a fuel while simultaneously recovering valuable natural gas liquids (NGLs). Natural gas from a well at about 50 psig is compressed by a compressor, and then cooled in multiple steps, such as through cooling with conditioned natural gas, heat exchanged with an air cooler, heat exchanged with an expanded gas from a separator, and heat exchanged by an expanded NGL stream from a separator. Some embodiments do not include all of the coolers. Subsequently, gas, NGL liquid, and water are separated in a primary separator. NGL from the primary separator is expanded and cooled. The cooled gas/liquid mixture is then separated in a second separator.

The compressor, usually provided on a separate skid, is modified to work as an integrated part of the NGC system in two ways. First, the gas from the second separator is connected by piping to allow the second separator gas to be recycled to the compressor skid to improve recovery of NGL. Second, hot gas from the compressor is piped to the condition gas cooler to provide a heat sink upstream of an ambient air cooler. The resulting pre-cooled gas is returned to the ambient air cooler (the compressor aftercooler), allowing the ambient air cooler to operate closer to the ambient air temperature.

The NGC process is differentiated by traditional mechanical refrigeration or Joule Thompson cooling systems by several features. For example, inlet gas is indirectly cooled by a Joule Thompson expansion of the separator gas and separator NGL to preclude emulsification problems that are common in traditional Joule Thompson systems. Further, the heat integration of the conditioned gas cooler upstream of the ambient air cooler is different than traditional processes. Finally, no mechanical refrigeration system is required, which simplifies the process and lowers capital cost.

Up to 80% of propane and heavier components are recoverable, depending on the rich gas composition. The intensity of the flare can be reduced by up to 50%.

BRIEF DESCRIPTION OF THE DRAWINGS

FIG. 1 is a process flow diagram for a system to implement a natural gas conditioning process whereby rich natural gas is compressed and then first cooled in an air cooler, and then by a gas expansion cooler, and finally by a NGL expansion cooler according to some embodiments.

DETAILED DESCRIPTION

An Embodiment of a Natural Gas Conditioning Process

Referring now to FIGURE. NGL is separated from water and natural gas by a first separator, and then a second separator. A rich natural gas 51 serves as a feed into the system and flows into a compressor scrubber 52. The compressor scrubber 52 compresses the rich natural gas 51 to a pressure between about 600 psig and 1200 psig, and a temperature of the rich natural gas rises to about a temperature in the range of 200 to 300 deg. F. The hot, compressed gas 53 is cooled in an air cooler 54, such as by ambient air, to about a temperature between 50 deg. F and 130 deg. F. The cooled compression fluid 55 from the air cooler 54 is further cooled by flowing the compression fluid 55 into a hot side of a gas expansion cooler 56. The gas expansion cooler 56 turns the compression fluid 55 into a further cooled compression fluid 57. Further in the system, the cooled compression fluid 57 flows into a NGL cooler 58. A Further yet cooled compression fluid 59 flows from the NGL expansion cooler 58, which then flows into a first separator 60.

Three streams exit the first separator 60. A water stream 72 flows from a bottom of the first separator 60. The water stream 72 can then be put to other uses downstream directly or after treatment to remove any residual components from the separation.

A conditioned gas 61 exits the first separator 60 and flows through a gas expansion valve 62. The gas expansion valve 62 facilitates keeping pressure inside the first separator 60 at a working pressure approximately between 600 psig and 1200 psig depending on a composition and characteristics of the inbound compression fluid 59. The gas 63 from the gas expansion valve 62 flows through a cold side of the gas expansion cooler 56. The gas 64 from the gas expansion cooler 56 leaves the system as a conditioned gas 64. The conditioned gas 64 exits at a pressure approximately between 50 psig and 400 psig and at a temperature between 50 and 200 deg. F.

The NGL stream 65 exits the first separator 60 and flows through a NGL valve 66. A cooled NGL/gas mixture 67 from the NGL valve 66 flows into a cold side of the NGL expansion cooler 58. A NGL/gas mixture 68 from the NGL expansion cooler 58 flows into a second separator 69 where a recycle gas 70 is separated from an output stream of a NGL stream 71. The NGL stream 71 exits at a pressure approximately between 100 psig and 250 psig and at a temperature between 20 and 80 deg. F. The recycle gas 70 exits at a pressure approximately between 100 psig and 250 psig and at a temperature between 20 and 80 deg. F. The recycle gas 70 may be recycled to the compressor 52 or put to another use downstream directly or after treatment. Relative ratios of the conditioned gas stream 61, NGL stream 65 and water stream 72 vary according to a composition of the rich natural gas 51.

The system may further include a mobile skid configured to be deliverable to a well site. The skid may carry the inlet, compressor scrubber, first separator, second separator the NGL valve, gas expansion cooler, the NGL cooler, and the outlet.

The above described process can be differentiated from other processes because there is not a reboiler or a gas expansion cooler between the compressor and the air cooler.

What is claimed is:

1. A natural gas conditioning system, comprising:
   a. an inlet configured to be coupled to a high-pressure and high-temperature rich gas source;
   b. a compressor scrubber coupled to the inlet and configured to separate water from a compression fluid resulting in high-pressure and high-temperature compression fluid containing high-pressure and high-temperature hydrocarbon liquids;
   c. a first separator coupled to the compressor scrubber to receive the compression fluid and configured to separate the hydrocarbon liquids from conditioned gas resulting in separated cooled lower-density conditioned gas and hydrocarbon liquids;
   d. a NGL valve coupled to the first separator and configured to receive the hydrocarbon liquids and to expand the hydrocarbon liquids to reduce the pressure and temperature of the hydrocarbon liquids resulting in low-temperature and low-pressure hydrocarbon liquids;
   e. a gas expansion cooler coupled between the first separator and the compressor scrubber and configured to transfer heat from the compression fluid to the separated cooled lower-density conditioned gas;
   f. a NGL cooler coupled between the gas expansion cooler and the first separator and configured to transfer heat from the compression fluid to the low-temperature and low-pressure hydrocarbon liquids;
   g. a second separator coupled to the first separator and NGL cooler and configured to receive the low-temperature and low-pressure hydrocarbon liquids and to separate water, hydrocarbon gases and natural gas liquids (NGLs) from the low-temperature and low-pressure hydrocarbon liquids; and
   h. a conditioned gas outlet coupled to the first separator and the gas expansion cooler and configured to provide heated lower-density conditioned gas.

2. The natural gas conditioning system in accordance with claim 1, further comprising:
   a mobile skid configured to be deliverable to a well site; and
   the compressor scrubber, first separator, the NGL valve, gas expansion cooler and the NGL cooler, being carried by the skid.

3. The system of claim 1, further comprising a gas valve disposed between the first separator and the gas expansion cooler, and configured to receive conditioned gas therethrough.

4. A natural gas conditioning system, comprising:
   a. a pair of separators comprising:
   b. a compressor scrubber configured to separate water from a rich gas resulting in high-pressure and high-temperature compression fluid containing high-pressure and high-temperature hydrocarbon liquids; and
   c. a first separator coupled to the compressor scrubber to receive the compression fluid and configured to separate the hydrocarbon liquids from the compression fluid resulting in separated, cooled lower-density conditioned gas and hydrocarbon liquids;
   d. a pair of heat exchangers coupled between the pair of separators comprising:
   e. a gas expansion cooler configured to cool the compression fluid from the compressor scrubber by transferring heat to the separated cooled lower-density conditioned gas from the first separator; and
   f. a NGL cooler configured to cool the compression fluid from the compressor scrubber by transferring heat to the hydrocarbon liquids from the first separator; and
   g. a NGL valve coupled between the first separator and the NGL cooler and configured to receive the hydrocarbon liquids from the first separator and to expand the hydrocarbon liquids to reduce the pressure and temperature of the hydrocarbon liquids resulting in low-temperature and low-pressure hydrocarbon liquids.

5. The natural gas conditioning system in accordance with claim 4, further comprising:
   a second separator coupled to the first separator and NGL cooler and configured to receive the low-temperature and low-pressure hydrocarbon liquids and to separate water, hydrocarbon gases and natural gas liquids (NGLs) from the low-temperature and low-pressure hydrocarbon liquids.

6. The natural gas conditioning system in accordance with claim 5, further comprising:
   a mobile skid configured to be deliverable to a well site; and
   the compressor scrubber, the first separator, the second separator, the NGL valve, the gas expansion cooler and the NGL cooler, being carried by the skid.

7. The natural gas conditioning system in accordance with claim 6, further comprising:
   an inlet carried by the mobile skid and configured to be coupled to a high-pressure and high-temperature rich gas source, the compressor scrubber being coupled to the inlet; and
   a conditioned gas outlet carried by the mobile skid and coupled to the first separator and the gas expansion cooler and configured to provide heated lower-density conditioned gas.

8. The system of claim 4, further comprising a gas valve disposed between the first separator and the gas expansion cooler, and configured to receive conditioned gas therethrough.

9. A method for treating conditioned gas, comprising:
   a. separating water from a high-pressure and high-temperature rich gas by passing compression fluid through a compressor scrubber resulting in high-pressure and high-temperature compressor fluid containing high-pressure and high-temperature hydrocarbon liquids;
   b. cooling the conditioned gas a the gas expansion cooler and NGL cooler, resulting in cooled compression fluid;
   c. separating the high-pressure and high-temperature hydrocarbon liquids from the compression fluid by passing the conditioned gas through a first separator resulting in separated cooled lower-density conditioned gas and hydrocarbon liquids;
d. expanding the hydrocarbon liquids to reduce the pressure and temperature of the hydrocarbon liquids by passing the hydrocarbon liquids through a NGL valve resulting in low-temperature and low-pressure hydrocarbon liquids;
e. passing the low-temperature and low-pressure hydrocarbon liquids through the NGL cooler to cool the compression fluid; and
f. passing the cooled lower-density conditioned gas through the gas expansion cooler to cool the compression fluid and heat the lower-density conditioned gas, resulting in heated lower-density conditioned gas.

10. The method in accordance with claim 9, further comprising:
separating water and natural gas liquids (NGL) from the low-temperature and low-pressure hydrocarbon liquids by passing the hydrocarbon liquids through a second separator.

11. The method in accordance with claim 9, wherein a pressure of the conditioned gas is maintained at between 600 to 1200 psig.

12. The method in accordance with claim 9, wherein a temperature of the conditioned gas after treatment is between 60 to 120° F.

13. The method in accordance with claim 9, further comprising:
positioning a mobile skid carrying the compressor scrubber and first separator, the NGL valve, the gas expansion cooler and the NGL cooler adjacent to a well site.

14. The method of claim 9, further comprising a gas valve disposed between the first separator and the gas expansion cooler, and configured to receive conditioned gas therethrough.

* * * * *